US012747668B1

(12) United States Patent
D'Ettole et al.

(10) Patent No.: US 12,747,668 B1
(45) Date of Patent: Sep. 29, 2026

(54) DAMPER ASSEMBLY

(71) Applicant: GE Avio S.r.l., Rivalta di Torino (IT)

(72) Inventors: Antonio Giuseppe D'Ettole, Rivoli (IT); Gianmaria Sartor, San Martino di Lupari (IT); Veronica Iannotti, Turin (IT); Emanuele Rosso, Grugliasco (IT)

(73) Assignee: GE Avio S.R.L., Rivalti di Torino (IT)

( * ) Notice: Subject to any disclaimer, the term of this patent is extended or adjusted under 35 U.S.C. 154(b) by 0 days.

(21) Appl. No.: 19/293,010

(22) Filed: Aug. 7, 2025

(30) Foreign Application Priority Data

Mar. 28, 2025 (IT) ........................ 102025000006528

(51) Int. Cl.
*F01D 5/26* (2006.01)
*F01D 5/16* (2006.01)
*F01D 25/06* (2006.01)

(52) U.S. Cl.
CPC ................. *F01D 5/26* (2013.01); *F01D 5/16* (2013.01); *F01D 25/06* (2013.01); *F05D 2240/30* (2013.01); *F05D 2260/96* (2013.01)

(58) Field of Classification Search
CPC ... F01D 5/16; F01D 5/26; F01D 25/04; F01D 25/06; F05D 2240/30; F05D 2260/96
See application file for complete search history.

(56) References Cited

U.S. PATENT DOCUMENTS 3,610,778 A 10/1971 Suter
4,177,013 A 12/1979 Patterson et al.
5,478,207 A * 12/1995 Stec .......................... F01D 5/22 416/500
6,447,250 B1 9/2002 Corrigan et al.
6,776,583 B1 * 8/2004 Wang ........................ F01D 5/22 416/500
6,851,932 B2 * 2/2005 Lagrange .................. F01D 5/22 416/190
7,121,800 B2 * 10/2006 Beattie ...................... F01D 5/22 416/193 A
7,762,780 B2 7/2010 Decardenas
7,976,281 B2 * 7/2011 Keith .................... F01D 11/008 416/193 A
8,011,892 B2 9/2011 Ramlogan et al.
8,137,071 B2 3/2012 Caucheteux et al.
8,393,869 B2 * 3/2013 Kim ...................... F01D 11/008 416/239

(Continued)

FOREIGN PATENT DOCUMENTS

CN 118188052 A 6/2024
EP 3078808 A1 10/2016

*Primary Examiner* — Sang K Kim
(74) *Attorney, Agent, or Firm* — McCarter & English, LLP

(57) ABSTRACT

A damper assembly for a blade, the damper assembly defining a longitudinal direction, a lateral direction, and a vertical direction and including a base extending in the longitudinal direction from a first end to a second end, the base including a forward face, a rear face, and a top face, a first contact region defined on the top face between the first end and the second end, the first contact region defining a first curved surface, and a second contact region defined on the rear face between the first end and the second end, the second contact region defining a second curved surface. The first curved surface abuts the second curved surface at a common position in the longitudinal direction.

20 Claims, 7 Drawing Sheets

(56) References Cited

U.S. PATENT DOCUMENTS

| | | | | |
|---|---|---|---|---|
| 8,876,478 | B2 * | 11/2014 | Wassynger | F01D 5/24<br>416/193 A |
| 9,121,293 | B2 | 9/2015 | Calza et al. | |
| 9,506,372 | B2 * | 11/2016 | Schoenhoff | F01D 5/22 |
| 9,810,075 | B2 | 11/2017 | Lana et al. | |
| 9,822,644 | B2 | 11/2017 | Tardif et al. | |
| 9,840,931 | B2 | 12/2017 | Joshi et al. | |
| 10,012,085 | B2 | 7/2018 | Hough et al. | |
| 10,436,212 | B2 | 10/2019 | Perdrigeon et al. | |
| 10,907,482 | B2 | 2/2021 | Snyder et al. | |
| 11,466,571 | B1 * | 10/2022 | Joly | F04D 29/34 |
| 2013/0323058 | A1 * | 12/2013 | Zhang | F01D 5/26<br>416/144 |
| 2021/0087939 | A1 * | 3/2021 | D'Ettole | F01D 11/008 |

* cited by examiner

DAMPER ASSEMBLY

PRIORITY INFORMATION

The present application claims priority to Italian Patent Application Number 102025000006528 filed on Mar. 28, 2025.

FIELD

The present disclosure relates to a damper assembly for a blade of a gas turbine engine.

BACKGROUND

At least some gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the first drive shaft rotatably drives the compressor. The gas stream expands as it flows through a low-pressure turbine positioned aft of the high-pressure turbine. The low-pressure turbine includes a rotor assembly having a fan coupled to a second drive shaft. The low-pressure turbine rotatably drives the fan through the second drive shaft. Gas turbine engines further include various airfoils or blades throughout the various stages of the engine, such as fan blades, compressor blades, turbine blades, etc.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
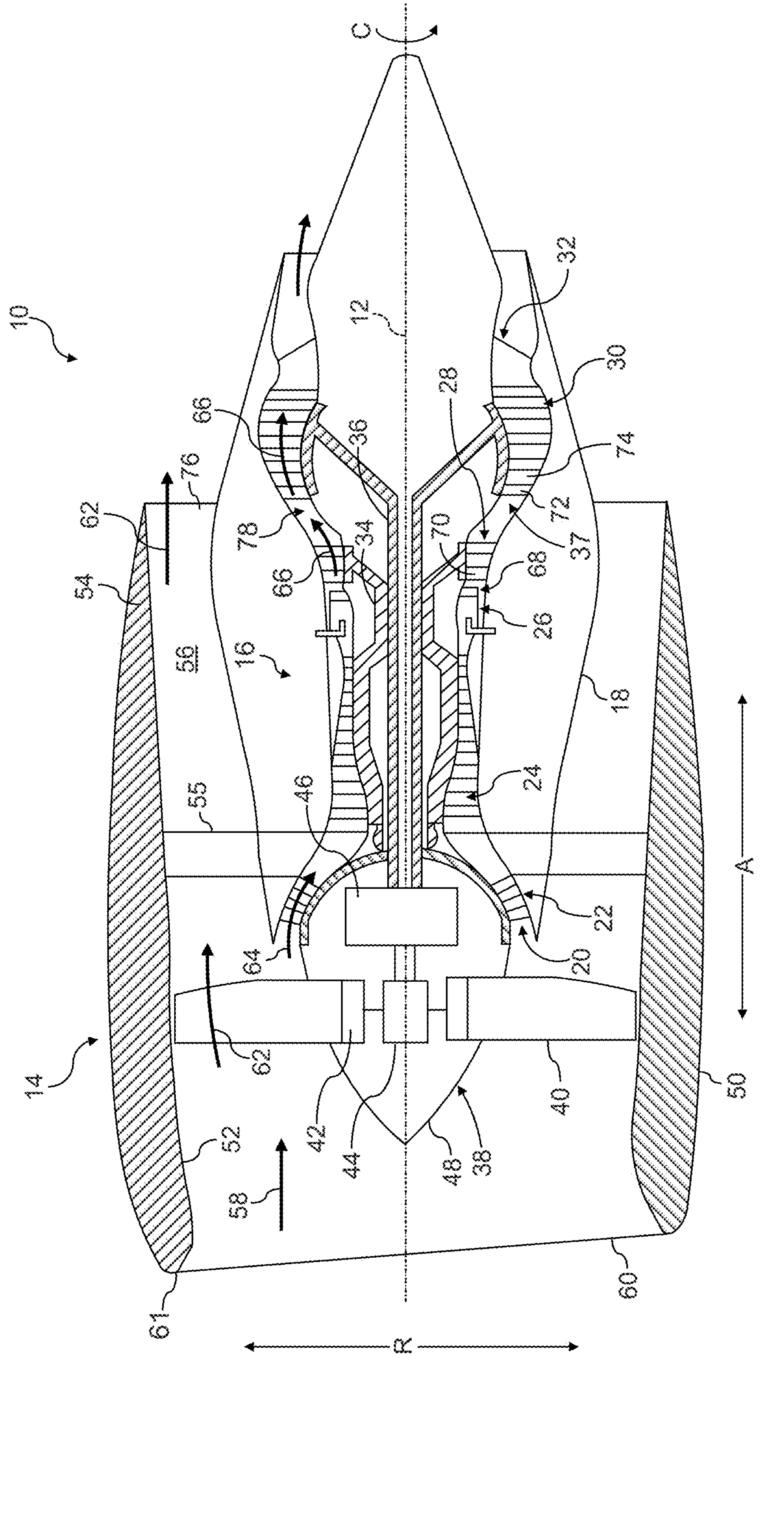
FIG. 1 is a schematic view of an exemplary gas turbine engine according to the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

For purposes of the description hereinafter, the terms "vertical," "radial", "axial," "cylindrical," "longitudinal," "lateral," and derivatives thereof shall relate to the embodiments as they are oriented in the drawing figures. However, it is to be understood that the embodiments may assume various alternative variations, except where expressly specified to the contrary. It is also to be understood that the embodiments illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first," "second," "third," and other ordinals are used to distinguish one component from another and are not intended to signify location or importance of the individual components.

As used herein, a "convex" surface or a surface that is "convex" from another surface is a surface that protrudes outward from a flat datum.

Variable pitch open rotor fans may experience high vibrations due to flutter, fan blade wakes, engine core vibrations, or other synchronous excitations. The present disclosure is generally related to damping of unshrouded turbine or fan blades in a blade assembly. To reduce vibrations of blades, damper assemblies include contact regions that absorb energy from the blades. The contact regions may be flat or cylindrical to accommodate the shape of the blade assembly. The arrangement of the contact regions provides specific reduction in vibrations for one of the blades.

By incorporating cylindrical contact regions on multiple faces of the damper assembly, vibrations are absorbed more readily from the blade and from adjacent blades. In particular, sizing the contact regions with a specified ratio of length to radius of curvature improves dissipation of the vibrations by improving contact between the damper assembly and the blades while reducing or avoiding fretting. Such an assembly improvise identification of contact points with the blades and characterizes contact parameters used for damper assembly design.

Referring now to the drawings, wherein identical numerals indicate the same elements throughout the figures, FIG. 1 is a cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10." The turbofan engine 10 is configured to be mounted to an aircraft, such as in an under-wing configuration or a tail-mounted configuration. As shown in FIG. 1, the turbofan engine 10 defines an axial direction A (extending parallel to a longitudinal centerline 12 provided for reference), a radial direction R, and a circumferential direction C (i.e., a direction extending about the axial direction A). The longitudinal centerline 12 defines a longitudinal axis of the turbofan engine 10. In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38. The turbomachine 16 is operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. The fan blades 40, disk 42, and an actuation member 44 are together rotatable about the longitudinal centerline 12 by the LP shaft 36 across a power gearbox 46. The power gearbox 46 includes a plurality of gears for stepping down the rotational speed of the LP shaft 36 to a more efficient rotational fan speed. Accordingly, for the embodiment depicted, the turbomachine 16 is operably coupled to the fan 38 through the power gearbox 46.

Referring still to the exemplary embodiment of FIG. 1, the disk 42 is covered by a rotatable front nacelle or hub 48 aerodynamically contoured to promote an airflow through the plurality of fan blades 40. Additionally, the exemplary fan section 14 includes an annular fan casing or outer nacelle 50 that at least partially (and for the embodiment depicted, circumferentially) surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50, the fan section 14, or both. As the volume of air 58 passes across the fan blades 40, a first portion 62 of the air 58 is directed or routed into the bypass airflow passage 56, and a second portion 64 of the air 58 is directed or routed into the core air flowpath 37. The pressure of the second portion 64 of air is then increased as it is routed through the HP compressor 24 and into the combustion section 26, where it is mixed with fuel and burned to provide combustion gases 66. The combustion gases 66 are routed from the combustion section 26 through the HP turbine 28. In the HP turbine 28, a portion of energy (such as thermal energy, kinetic energy, or both) from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of energy (such as thermal energy, kinetic energy, or both) is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22, rotation of the fan 38, or both.

The combustion gases 66 are subsequently routed through the jet exhaust nozzle section 32 of the turbomachine 16 to provide propulsive thrust.

Simultaneously, the pressure of the first portion 62 is substantially increased as the first portion 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least 20,000 pounds of thrust, such as at least about 25,000, 30,000, and up to, e.g., 150,000 pounds of thrust. Accordingly, the turbofan engine 10 may be referred to as a relatively large power class gas turbine engine.

Moreover, the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., the power gearbox 46) driving the fan, may include any other suitable number or arrangement of shafts, spools, compressors, turbines, etc. Further, although a turbofan engine is depicted in FIG. 1, in other exemplary embodiments, aspects of the present disclosure may be incorporated into any other suitable gas turbine engine, such as a turboprop engine, turboshaft engine, etc.

Figure 2:
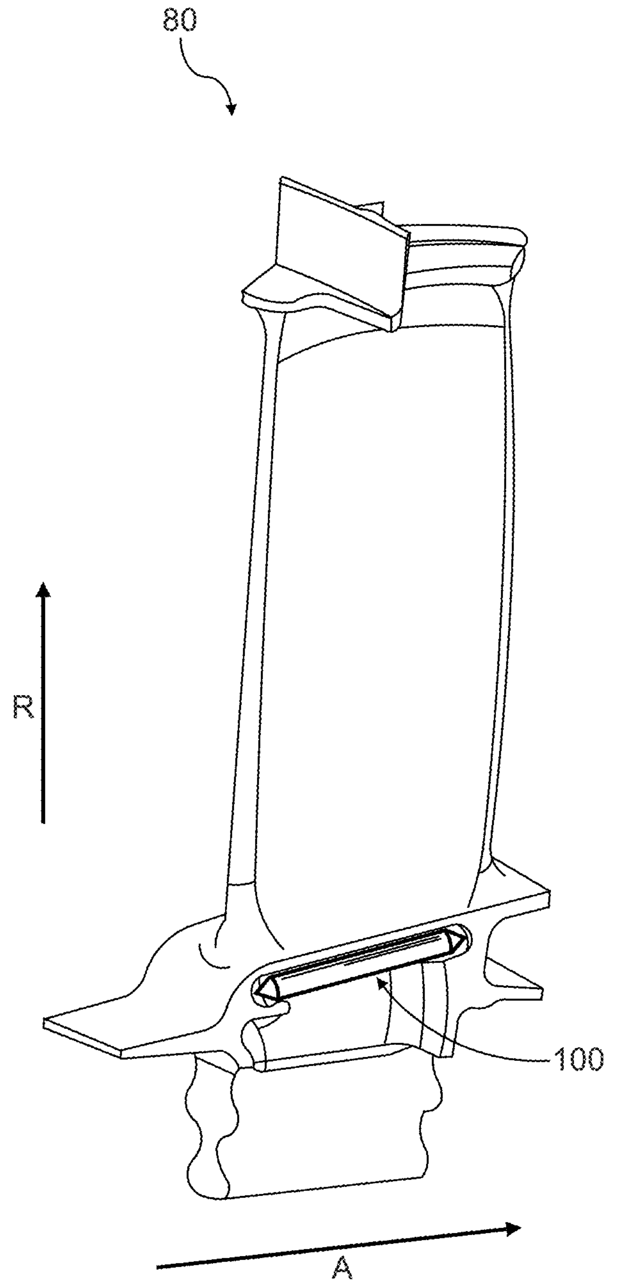
FIG. 2 is a perspective view of a blade of the gas turbine engine of FIG. 1 according to the present disclosure.

Now referring to FIG. 2, a schematic view of an exemplary turbine blade 80 is provided. The turbine blade 80 may be one of the blades of the HP turbine 28 or the LP turbine 30, as described above. The turbine blade 80 includes a damper assembly 100. The damper assembly 100 reduces vibrations of the turbine blade 80 during operation of the HP turbine 28 or the LP turbine 30. Specifically, the damper assembly 100 extends in an axial direction A such that vibrations in a radial direction R are absorbed, reducing vibrations transmitted to other components of the HP turbine 28 or the LP turbine 30.

Figure 3A:
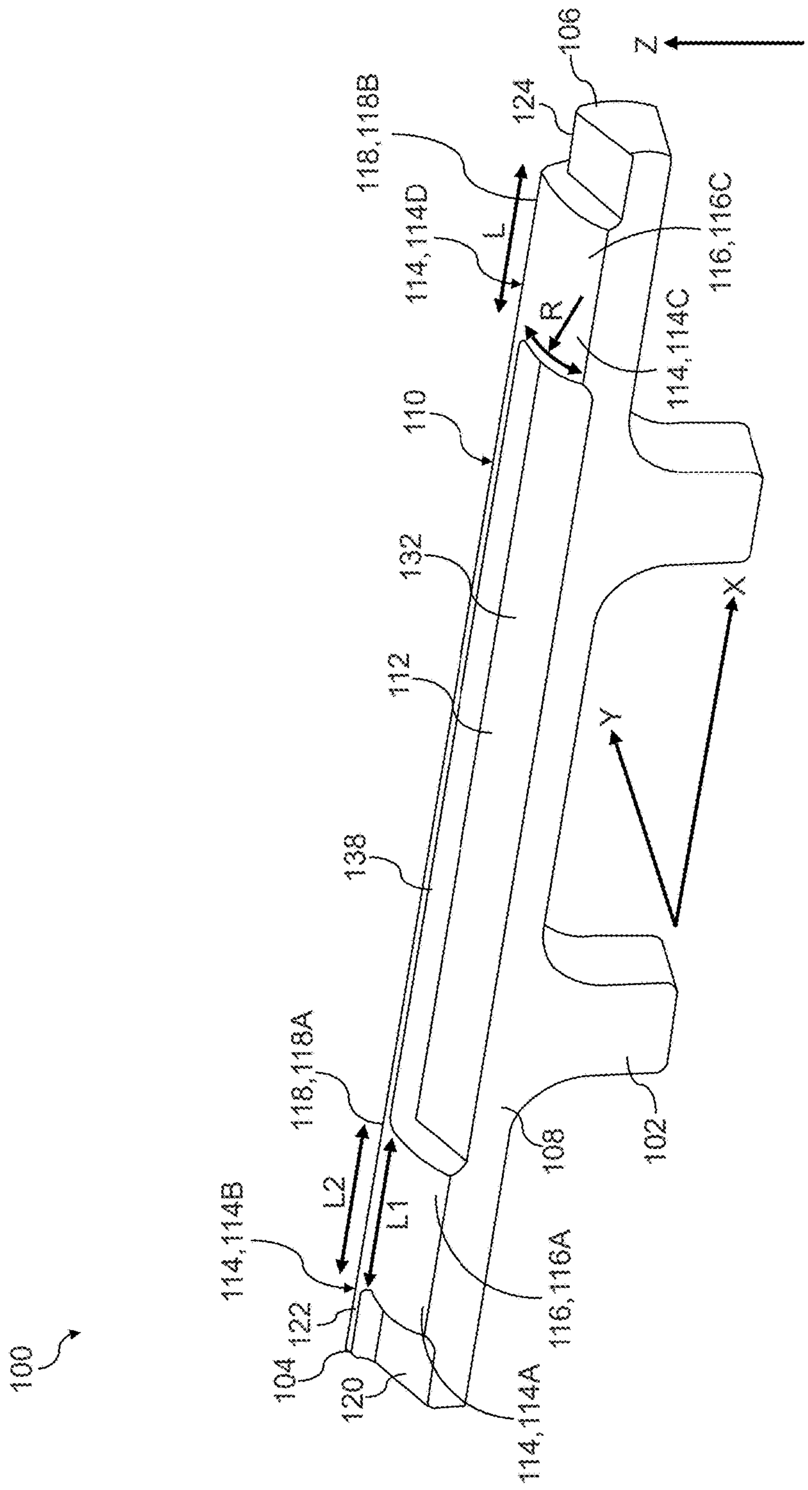
FIG. 3A is a perspective view of an exemplary damper assembly according to the present disclosure.
Figure 3B:
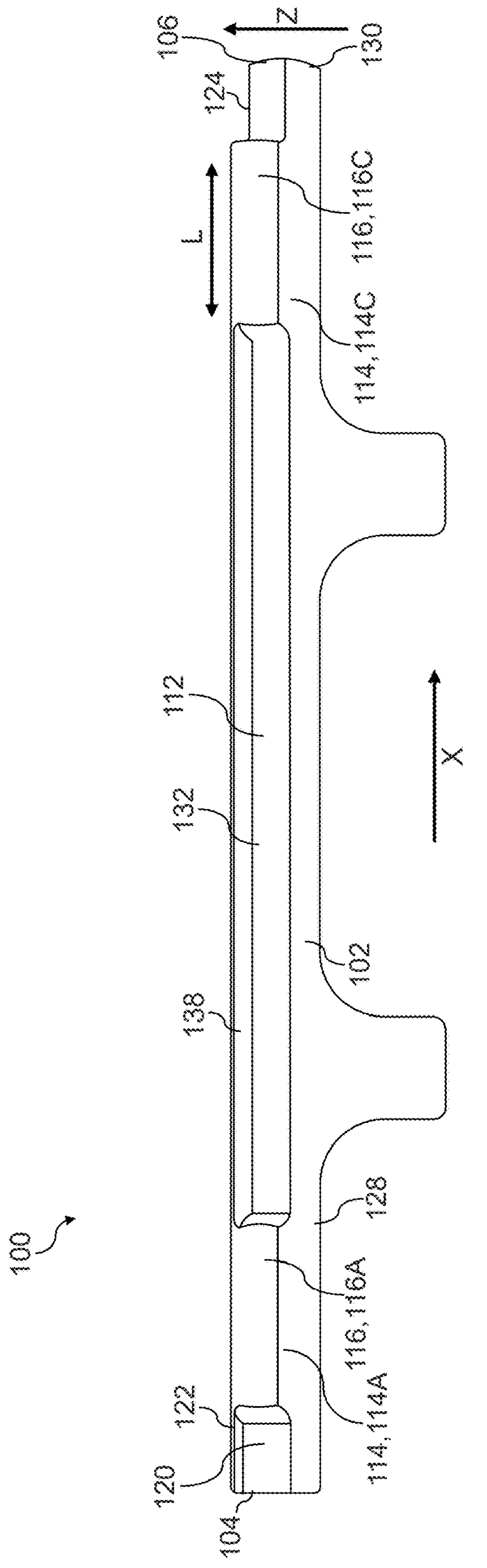
FIG. 3B is a front view of the exemplary damper assembly according to the present disclosure.

With reference to FIGS. 3A-3D, schematic views of an exemplary damper assembly 100 are provided. FIG. 3A is a perspective schematic view of the damper assembly 100. FIG. 3B is a front view of the damper assembly 100. FIG.

3C is a rear view of the damper assembly 100. FIG. 3D is a side view of the damper assembly 100. Throughout the views, the damper assembly 100 defines a longitudinal direction X, a lateral direction Y, and a vertical direction Z.

The damper assembly 100 includes a base 102. The base 102 extends in the longitudinal direction X from a first end 104 to a second end 106. The base 102 includes a forward face 108, a rear face 110, and a top face 112. In this context, a "face" is a substantially flat portion of the base 102 supporting or otherwise locating other parts of the damper assembly 100. As shown in FIG. 3D, the base 102 is substantially trapezoidal, such that the top face 112 defines a nonzero obtuse angle θ with the forward face 108 and the forward face 108 is parallel to the rear face 110.

Referring back to FIGS. 3A-3D, the damper assembly 100 includes a plurality of contact regions 114. In this context, a "contact region" is a structure disposed on the base 102 that is configured to contact and absorb energy from the turbine blade 80 (FIG. 2). Each contact region 114 defines a curved surface 116. The curved surface 116 is a generally cylindrical, convex surface that extends out from the base 102. In particular, the curved surface 116 of the contact region 114 defines a length L in the longitudinal direction X and a radius of curvature R. The curved surface 116 approximates an arc of a circle with a radius defined by the radius of curvature R, defining a half cylinder with at least one of the rear face 110 or the top face 112.

The inventors have discovered that, when a ratio of the length L to the radius of curvature R of the curved surface 116 is in a range from 0.45 to 1.20, the contact region 114 advantageously absorbs a contact pressure from the turbine blade 80 (FIG. 2) in a range from 300 to 350 megapascals (MPa). Preferably, the ratio may be in a range from 0.45 to 1.00, which is specified based on the contact pressure expected to be applied by the turbine blade 80 (FIG. 2). The curved surfaces 116 of the plurality of contact regions 114 are "convex" from the base 102, which means the curved surface 116 protrude outward from the top face 112 or the rear face 110.

The plurality of contact regions 114 are arranged at specified locations on the base 102. In the example of FIGS. 3A-3D, a first contact region 114A is defined on the top face 112 between the first end 104 and the second end 106, a second contact region 114B is defined on the rear face 110 between the first end 104 and the second end 106, a third contact region 114C is defined on the top face 112 between the first contact region 114A and the second end 106, and a fourth contact region 114D defined on the rear face 110 between the second contact region 114B and the second end 106. FIGS. 3A-3D show four contact regions 114A, 114B, 114C, 114D (collectively, "contact regions 114), and it will be appreciated that the damper assembly 100 may include a different number of contact regions, such as two, six, eight, or more. Additionally, the contact regions 114 may be defined in different arrangements on the base 102, such as two contact regions 114 defined on the top face 112 and one contact region 114 defined on the rear face 110, two contact regions 114 defined on the rear face 110 and one contact region 114 defined on the top face 112, and other combinations.

Each contact region 114A, 114B, 114C, 114D has a corresponding curved surface, including a first curved surface 116A, a second curved surface 116B, a third curved surface 116C, a fourth curved surface 116D (collectively, "curved surfaces 116"). In the example of FIGS. 3A-3D, each curved surface 116 has a same length L and a same radius of curvature R. As an example, a length of the first curved surface 116A, $L_1$, may be a same length as a length of the second curved surface 116B, $L_2$. Alternatively, one or more of the curved surfaces 116 may have a different length L and/or a different radius of curvature R than another of the curved surfaces 116.

The first and second contact regions 114A, 114B are arranged such that the first curved surface 116A abuts the second curved surface 116B at one or more common positions in the longitudinal direction X. In such a form, the first and second contact regions 114A, 114B coincide in the longitudinal direction X, overlapping specific longitudinal positions. As described above, the first curved surface 116A has a length $L_1$, and the first contact region 114A is also defined by the length $L_1$. The second curved surface 116B has a length $L_2$, and the second contact region 116B is also defined by the length $L_2$. As best shown in FIG. 3A, the first and second contact regions 114A, 114B overlap their entire lengths $L_1$, $L_2$ in the longitudinal direction X, such that their lengths L share the same longitudinal positions.

Two or more curved surfaces 116 abut each other at a seam 118. In particular, the first and second curved surfaces 116A, 116B may abut each other at a first seam 118A, and the third and fourth curved surfaces 116C, 116D may abut each other at a second seam 118B. That is, the first curved surface 116A extends smoothly to the second curved surface 116B across the first seam 118A. The first seam 118A is disposed vertically upward from the top face 112 and the rear face 110, such that the first and second curved surfaces 116A, 116B are disposed away from the base 102. By smoothly transitioning from the first curved surface 116A to the second curved surface 116B across the first seam 118A, vibrations are absorbed more readily by the first and second contact regions 114A, 114B.

The base 102 includes a first flat region 120 extending from the first end 104 to the first contact region 114A. The first flat region 120 has no curved surface, and the first contact region 114A extends above the first flat region 120 in the vertical direction Z. The first flat region 120 extends along the top face 112 of the base 102 to a ledge 122 that extends from the first end 104 to the first seam 118A of the first and second curved surfaces 116A, 116B. The ledge 122 is disposed above the first flat region 120 in the vertical direction Z. It will be appreciated that the first flat region 120 is disposed entirely on the top face 112.

The base 102 includes a second flat region 124 extending from the second end 106 to the third contact region 114C. The second flat region 124 extends from the top face 112 of the base 102 to the rear face 110 of the base 102, with no ledge between the top face 112 and the rear face 110. The second flat region 124 is shorter in the vertical direction Z than the third curved surface 116C and shorter in the lateral direction Y than the fourth curved surface 116D. The third curved surface 116C and the fourth curved surface 116D meet at the second seam 118B, and the second flat region 124 defines a corner 126 that is shorter in the vertical direction Z and shorter in the lateral direction Y than the second seam 118B. Specifically, as shown in FIG. 3D, the corner 126 and the second seam 118B define a nonzero vertical distance $Z_1$ and a nonzero lateral distance $Y_1$. The vertical distance $Z_1$ represents the distance of the second seam 118B above the corner 126 in the vertical direction Z, and the lateral distance $Y_1$ represents the distance of the second seam 118B away from the corner 126 in the lateral direction Y. In the orientation of FIG. 3D, the corner 126 is "shorter" than the second seam 118B because the corner 126 does not extend as far from a reference datum, such as a bottom 128 of the base 102, than the second seam 118B.

Because the corner 126 is shorter than the third and fourth contact regions 114C, 114D, the turbine blades 80 (FIG. 2) do not engage the second flat region 124.

Figure 3C:
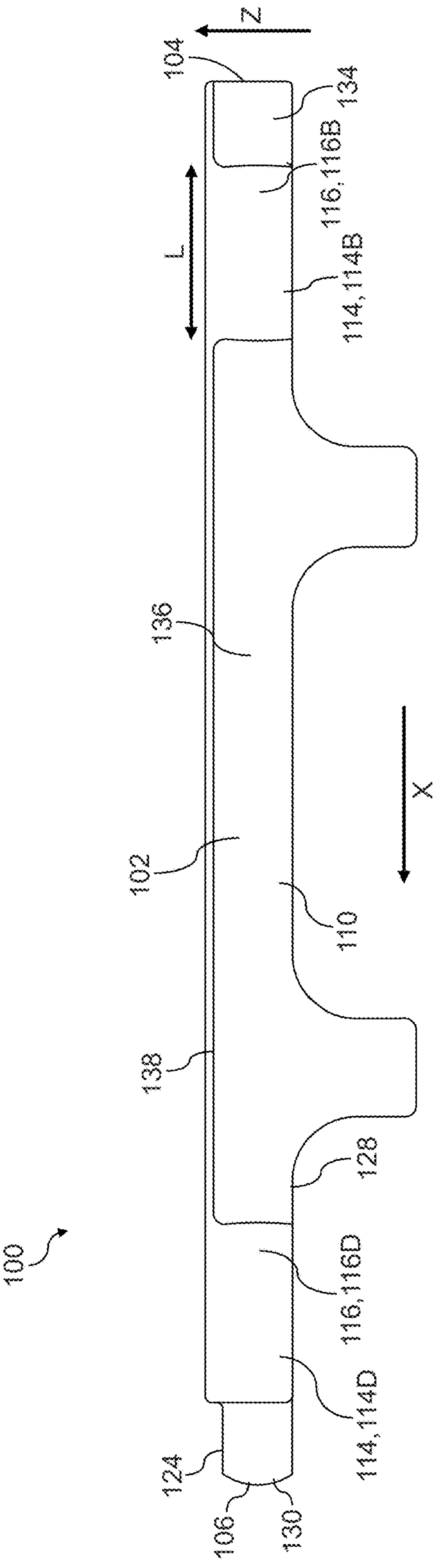
FIG. 3C is a rear view of the exemplary damper assembly according to the present disclosure.
Figure 3D:
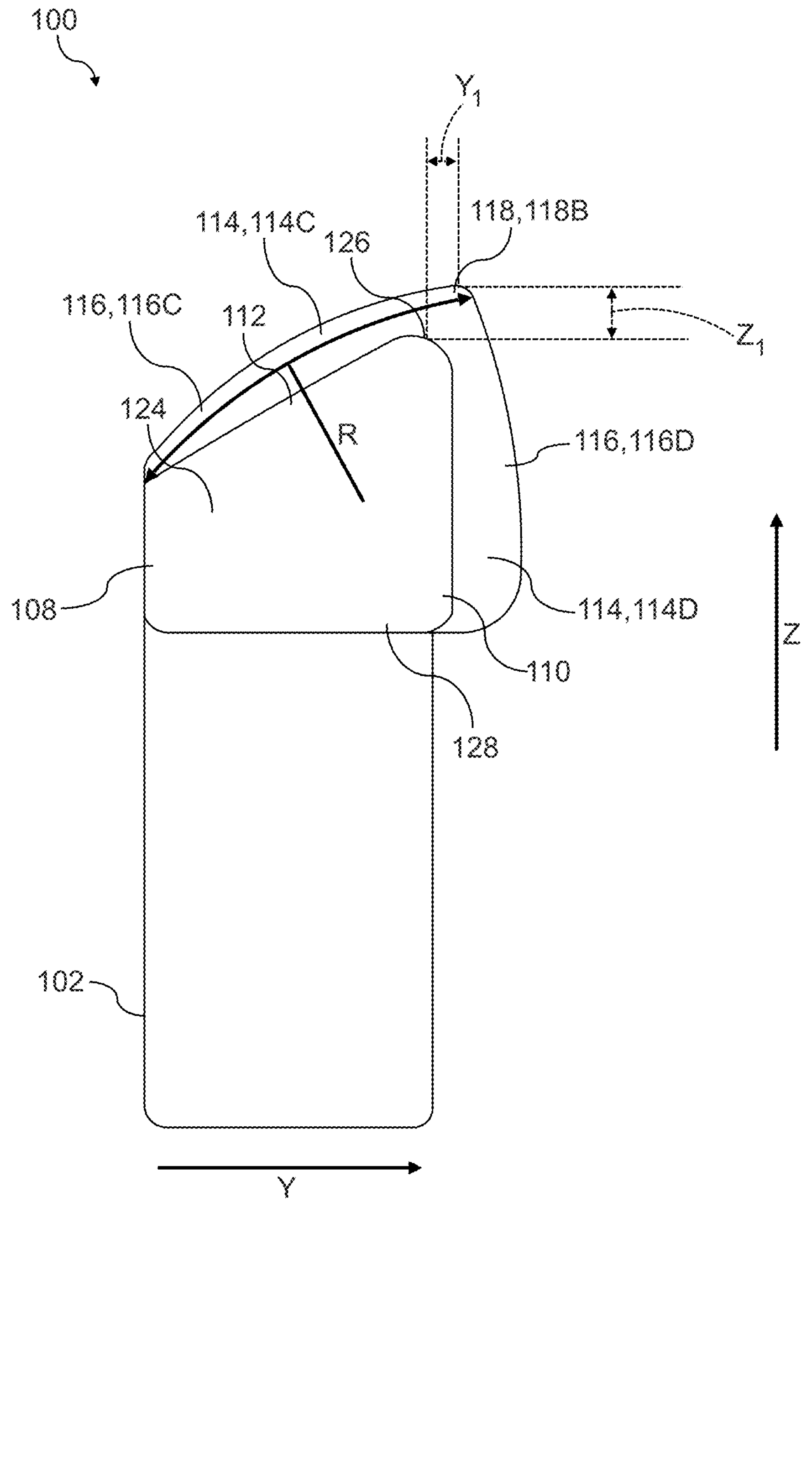
FIG. 3D is a side view of the exemplary damper assembly according to the present disclosure.

As best shown in FIGS. 3B-3C, the second flat region 124 defines a curved edge 130 at the second end 106. The curved edge 130 allows for additional vibration absorption from the turbine blade 80 (FIG. 2). The curved edge 130 is shaped to fit within the turbine blade 80 (FIG. 2), accommodating spatial constraints.

The base 102 may include additional flat regions on the top face 112 and the rear face 110. For example, the base 102 may include a third flat region 132 on the top face 112 extending between the first contact region 114A and the second contact region 114B, a fourth flat region 134 on the rear face 110 extending from the first end 104 to the second contact region 114B, and a fifth flat region 136 defined on the rear face 110 between the first contact region 114A and the second contact region 114B.

Additionally, the damper assembly 100 may include an intermediate region 138 extending along the top face 112 from the first contact region 114A to the third contact region 114C and along the rear face 110 from the second contact region 114B to the fourth contact region 114D. The intermediate region 138 is substantially flush with the curved surfaces 116 of the first, second, third, and fourth contact regions 114A, 114B, 114C, 114D. The intermediate region 138 acts as a ledge (similar to the ledge 122) connecting the contact regions 114A, 114B, 114C, 114D along the base 102.

Figure 4:
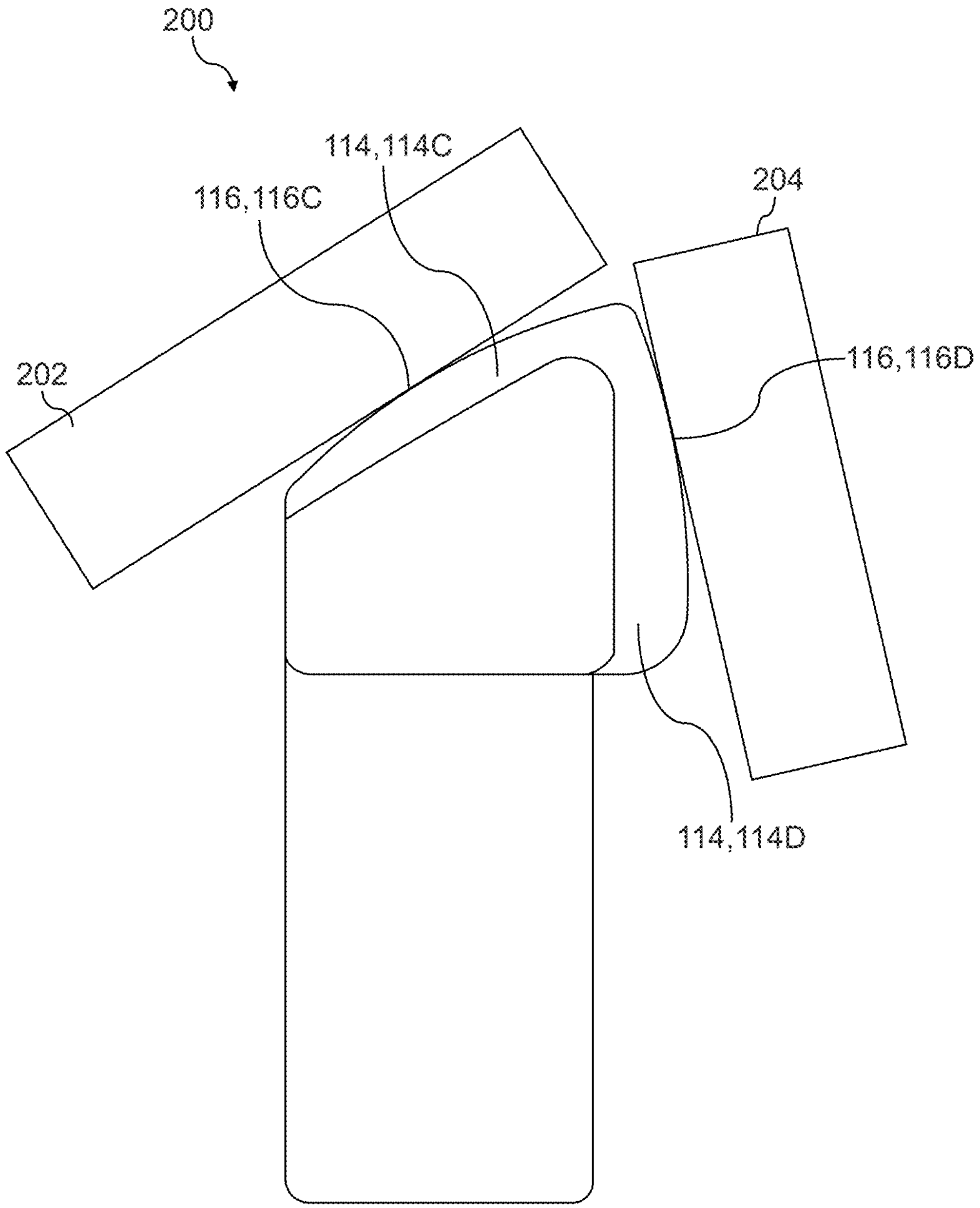
FIG. 4 is a side view of an exemplary turbine assembly according to the present disclosure.

Now referring to FIG. 4, a schematic view of a blade assembly 200 is provided. The blade assembly 200 may be a turbine blade assembly with turbine blades. The blade assembly 200 includes a first blade 202, a second blade 204, and a damper assembly 100. The first and second blades 202, 204 of FIG. 4 may be similar in construction and operation to the turbine blade 80 described above and shown in FIG. 2.

The damper assembly 100 includes a contact region abutting the first blade 202 (shown as the third contact region 114C) and another contact region abutting the second blade 204 (shown as the fourth contact region 114D). While not shown in FIG. 4, it will be appreciated that the first contact region 114A abuts the first blade 202 and the second contact region 114B abuts the second blade 204. Vibrations from the first blade 202 are dampened by the first and third contact regions 114A, 114C, and vibrations from the second blade 204 are dampened by the second and fourth contact regions 114B, 114D. As described above, a ratio (L/R) of the length L to the radius of curvature R of each curved surface 116 is in a range from 0.45 to 1.20. Specifically, the first and third curved surfaces 116A, 116C may have an L/R ratio in a range from 0.45 to 1.20, and the second and fourth curved surfaces 116B, 116D may have an L/R ratio in a range from 0.45 to 1.00. With these ratios, the damper assembly 100 absorbs vibrations from multiple blades 202, 204.

Further aspects are provided by the subject matter of the following clauses:

A damper assembly for a blade, the damper assembly defining a longitudinal direction, a lateral direction, and a vertical direction, the damper assembly including a base extending in the longitudinal direction from a first end to a second end, the base including a forward face, a rear face, and a top face, a first contact region defined on the top face between the first end and the second end, the first contact region defining a first curved surface, and a second contact region defined on the rear face between the first end and the second end, the second contact region defining a second curved surface, wherein the first curved surface abuts the second curved surface at a common position in the longitudinal direction.

The damper assembly of any of the preceding clauses, wherein the base includes a flat region extending from the first end to the first contact region.

The damper assembly of any of the preceding clauses, further including a third contact region defined on the top face between the first contact region and the second end, the third contact region defining a third curved surface.

The damper assembly of any of the preceding clauses, wherein the base includes a flat region extending from the first end to the first contact region, and wherein the base includes a second flat region extending from the second end to the third contact region.

The damper assembly of any of the preceding clauses, further comprising a fourth contact region defined on the rear face, the fourth contact region defining a fourth curved surface, wherein the top face of the second flat region is shorter in the vertical direction than the third curved surface and the top face of the second flat region is shorter in the lateral direction than the fourth curved surface.

The damper assembly of any of the preceding clauses, wherein the base includes a third flat region extending between the first contact region and the second contact region.

The damper assembly of any of the preceding clauses, further including an intermediate region extending along the top face and the rear face from the first contact region to the third contact region.

The damper assembly of any of the preceding clauses, wherein the first curved surface and the second curved surface abut each other at a seam.

The damper assembly of any of the preceding clauses, wherein the top face defines a nonzero obtuse angle with the forward face.

The damper assembly of any of the preceding clauses, wherein the forward face is parallel to the rear face.

The damper assembly of any of the preceding clauses, further including a third contact region defined on the rear face between the second contact region and the second end, the third contact region defining a third curved surface.

The damper assembly of any of the preceding clauses, wherein the first curved surface defines a length in the longitudinal direction and a radius of curvature, and a ratio of the length to the radius of curvature is in a range from 0.45 to 1.20.

The damper assembly of any of the preceding clauses, wherein the second curved surface defines a second length in the longitudinal direction and a second radius of curvature, and the ratio of the second length to the second radius of curvature is in a range from 0.45 to 1.20.

The damper assembly of any of the preceding clauses, wherein the ratio of the second length to the second radius of curvature is in a range from 0.45 to 1.00.

The damper assembly of any of the preceding clauses, wherein the base includes a fifth flat region defined on the rear face between the first contact region and the second contact region.

The damper assembly of any of the preceding clauses, further including a ledge that extends from the first end to the first seam of the first and second curved surfaces.

A damper assembly for a blade, the damper assembly defining a longitudinal direction, a lateral direction, and a vertical direction, the damper assembly including a base extending in the longitudinal direction from a first end to a second end, the base including a forward face, a rear face, and a top face, a first contact region defined on the top face between the first end and the second end, the first contact region defining a first curved surface convex from the top face, and a second contact region defined on the rear face between the first end and the second end, the second contact region defining a second curved surface convex from the rear face, wherein the base includes a flat region extending from the second end to the first contact region, wherein the flat region is shorter in the vertical direction than the first curved surface.

The damper assembly of any of the preceding clauses, wherein the first curved surface and the second curved surface meet at a seam, wherein the flat region defines a corner, and the corner is shorter in the vertical direction than the seam.

The damper assembly of any of the preceding clauses, further including a third contact region defined on the top face between the first contact region and the first end, the third contact region defining a third curved surface convex from the top face.

The damper assembly of any of the preceding clauses, further including a second flat region extending from the first contact region to the third contact region.

The damper assembly of any of the preceding clauses, wherein the flat region defines a curved edge at the second end.

The damper assembly of any of the preceding clauses, wherein the flat region extends from the top face to the rear face.

A blade assembly including a first blade, a second blade, and the damper assembly of any of the preceding clauses.

A blade assembly including a first blade, a second blade, and a damper assembly defining a longitudinal direction, a lateral direction, and a vertical direction, the damper assembly including a base extending in the longitudinal direction from a first end to a second end, the base including a forward face, a rear face, and a top face, a first contact region defined on the top face between the first end and the second end, the first contact region defining a first curved surface, and a second contact region defined on the rear face between the first end and the second end, the second contact region defining a second curved surface, wherein the base includes a flat region extending from the second end to the first contact region, wherein the top face of the flat region is shorter in the vertical direction than the first curved surface and the top face of the flat region is shorter in the lateral direction than the second curved surface, wherein the first blade abuts the first contact region, and wherein the second blade abuts the second contact region.

The blade assembly of any of the preceding clauses, wherein the first blade and the second blade are turbine blades.

The blade assembly of any of the preceding clauses, wherein the first blade abuts the third contact region and the second blade abuts the fourth contact region.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A damper assembly for a blade, the damper assembly defining a longitudinal direction, a lateral direction, and a vertical direction, the damper assembly comprising:

a base extending in the longitudinal direction from a first end to a second end, the base including a forward face, a rear face, and a top face, wherein the top face defines a non-zero angle with the forward face and the forward face is parallel to the rear face;

a first contact surface defined on the top face between the first end and the second end, the first contact surface defining a first curved surface, wherein the first curved surface is oriented outward relative the front face; and a second contact surface defined on the rear face between the first end and the second end, the second contact surface defining a second curved surface, wherein the second curved surface is oriented outward relative the rear face, and wherein the first curved surface abuts the second curved surface at a common position in the longitudinal direction.

2. The damper assembly of claim 1, wherein the base includes a flat region extending from the first end to the first contact surface.

3. The damper assembly of claim 1, further comprising a third contact surface defined on the top face between the first contact surface and the second end, the third contact surface defining a third curved surface.

4. The damper assembly of claim 3, wherein the base includes a flat region extending from the first end to the first contact surface, and wherein the base includes a second flat region extending from the second end to the third contact surface.

5. The damper assembly of claim 4, further comprising a fourth contact surface defined on the rear face, the fourth contact surface defining a fourth curved surface, wherein the top face of the second flat region is shorter in the vertical direction than the third curved surface and the top face of the second flat region is shorter in the lateral direction than the fourth curved surface.

6. The damper assembly of claim 4, wherein the base includes a third flat region extending between the first contact surface and the second contact surface.

7. The damper assembly of claim 3, further comprising an intermediate region extending along the top face and the rear face from the first contact surface to the third contact surface.

8. The damper assembly of claim 1, wherein the first curved surface and the second curved surface abut each other at a seam.

9. The damper assembly of claim 1, wherein the top face defines a nonzero obtuse angle with the forward face.

10. The damper assembly of claim 1, wherein the forward face is parallel to the rear face.

11. The damper assembly of claim 1, further comprising a third contact surface defined on the rear face between the second contact surface and the second end, the third contact surface defining a third curved surface.

12. The damper assembly of claim 1, wherein the first curved surface defines a length in the longitudinal direction and a radius of curvature, and a ratio of the length to the radius of curvature is in a range from 0.45 to 1.20.

13. The damper assembly of claim 12, wherein the second curved surface defines a second length in the longitudinal direction and a second radius of curvature, and the ratio of the second length to the second radius of curvature is in a range from 0.45 to 1.20.

14. The damper assembly of claim 13, wherein the ratio of the second length to the second radius of curvature is in a range from 0.45 to 1.00.

15. A damper assembly for a blade, the damper assembly defining a longitudinal direction, a lateral direction, and a vertical direction, the damper assembly comprising:

a base extending in the longitudinal direction from a first end to a second end, the base including a forward face, a rear face, and a top face, wherein the top face defines a non-zero angle with the forward face and the forward face is parallel to the rear face;

a first contact surface defined on the top face between the first end and the second end, the first contact surface defining a first curved surface convex from the top face, wherein the first curved surface is oriented outward relative the front face; and a second contact surface defined on the rear face between the first end and the second end, the second contact surface defining a second curved surface convex from the rear face, wherein the second curved surface is oriented outward relative the rear face, wherein the base includes a flat region extending from the second end to the second contact surface, and wherein the flat region is shorter in the vertical direction than the first curved surface.

16. The damper assembly of claim 15, wherein the first curved surface and the second curved surface meet at a seam, wherein the flat region defines a corner, and the corner is shorter in the vertical direction than the seam.

17. The damper assembly of claim 15, further comprising a third contact surface defined on the top face between the first contact surface and the first end, the third contact surface defining a third curved surface convex from the top face.

18. The damper assembly of claim 17, further comprising a second flat region extending from the first contact surface to the third contact surface.

19. The damper assembly of claim 15, wherein the flat region defines a curved edge at the second end.

20. The damper assembly of claim 15, wherein the flat region extends from the top face to the rear face.

* * * * *